United States Patent [19]

Sawai et al.

[11] Patent Number: 4,661,827

[45] Date of Patent: Apr. 28, 1987

[54] THERMAL HEAD

[75] Inventors: Hideo Sawai; Takashi Kanamori; Kenji Kuroki; Susumu Shibata, all of Tokyo, Japan

[73] Assignee: OKI Electric Industry Co., Ltd., Japan

[21] Appl. No.: 835,421

[22] Filed: Mar. 3, 1986

Related U.S. Application Data

[63] Continuation of Ser. No. 584,137, Feb. 27, 1984, abandoned.

[30] Foreign Application Priority Data

Mar. 9, 1983 [JP] Japan ................................ 58-37534

[51] Int. Cl.$^4$ ...................... H01C 17/18; G01D 15/10

[52] U.S. Cl. .............................. 346/76 PH; 427/305; 106/1.22; 219/543

[58] Field of Search ............... 338/309; 252/512, 513, 252/515, 181.6, 181.7, 518, 519; 219/216, 216 PH, 543; 346/76, 76 PH; 106/1.22; 427/305, 438; 428/936

[56] References Cited

U.S. PATENT DOCUMENTS

| | | | |
|---|---|---|---|
| 3,794,518 | 2/1974 | Howell | 252/515 |
| 4,136,274 | 1/1979 | Shibata et al. | 219/543 |
| 4,151,311 | 4/1979 | Feldstein | 427/305 |
| 4,259,564 | 3/1981 | Ohkubo et al. | 219/543 |
| 4,313,854 | 2/1982 | Sunahara et al. | 252/513 |

FOREIGN PATENT DOCUMENTS

| | | | |
|---|---|---|---|
| 0059889 | 5/1978 | Japan | 106/1.22 |

OTHER PUBLICATIONS

New Type Thermal Printing Head by Susuma Shibata et al., in IEEE Transactions, vol. PHP-12, No. 3, Sep. 1976.

*Primary Examiner*—Arthur G. Evans
*Attorney, Agent, or Firm*—Ratner & Prestia

[57] ABSTRACT

A heater element plated on a dielectric substrate through electroless plating process provides an excellent thermal head for thermally printing on a paper. Said heater element composes of nickel, one of phosphorus and boron, and some minor additive agent. That additive agent is one of tungsten and molybdenum by 2–10 weight %. Because of the addition of the additive agent, the life time and heat stress characteristics of a thermal head are considerably improved.

4 Claims, 6 Drawing Figures

THERMAL HEAD

This application is a continuation of application Ser. No. 584,137, filed Feb. 27, 1984.

BACKGROUND OF THE INVENTION

The present invention relates to a thermal head, in particular, relates to a thermal head with improved heater material which is conditioned for strong thermal stresses.

The present thermal head is used for thermal printing on a paper.

Conventionally, a heater material for a thermal head is produced through sputtering or evaporation, and/or a thick film technique.

However, the evaporation, and the sputtering which use a vacuum device need a large apparatus, and takes long time to produce a film, and therefore, the producing cost of a thermal head must be high. And, the thick film technique which has the basic printing process utilizing paste has the disadvantage that a fine pattern can not be produced.

Another prior process for producing a heater material is chemical plating, or electroless plating, which has none of the above disadvantages. However, conventionally, a film produced through electroless plating has no superior characteristics for a thermal head. The important disadvantage of a prior film produced through electroless plating is that the resistance of a heater is not stable during thermal stress.

SUMMARY OF THE INVENTION

It is an object, therefore, of the present invention to overcome the disadvantages and limitations of a prior thermal head by providing a new and improved thermal head.

It is also an object of the present invention to provide a thermal head with a heater element produced through electroless plating process, having excellent life time and heat stress characteristics.

The above and other objects are attained by a thermal head having a dielectric substract, a plurality of heater elements attached on a surface of said substrate through electroless plating process, and lead lines coupled with said heater elements, wherein one of said heater elements are composed of nickel, one of phosphorus and boron, and additive agent of one of tungsten and molybdenum by more than 2 weight %.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
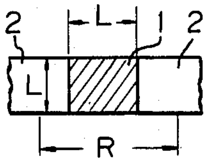
FIG. 1 is an explanatory drawing of a sheet resistance.

The chemical plating or electroless plating is available for a layer of nickel, copper, gold, tin, cobalt et al, and among them nickel group alloy is preferable for a heater element of a thermal head, since the material has high stable sheet resistivity, which is defined as the resistance across a square sheet. In FIG. 1, the sheet resistivity of the material 1 which is square with each length L is R which is the resistance across that square sheet. The numeral 2 is a conductor lead. It should be appreciated that a sheet resistivity is independent from the length L, but is defined only by the thickness of a film, and a nature of the same. Therefore, a value of a sheet resistivity is used to evaluate material of a heater element of a thermal head.

When a nickel film is produced through electroless plating process, it is inevitable that some impurities (alloy) are included in a film. Those impurities come from reducing agent in plating liquid. When reducing agent is hypophosphite salt, the impurity is phosphorus, and when the reducing agent is boron-hydrogen carbon, the impurity is boron.

A film produced through electroless plating has the nature of the higher volume resistivity than that produced through evaporation, sputtering, or electroplating. The reason of that higher volume resistivity is the finer crystal grain. And, the fine crystal grain comes from the presence of impurities (phosphorus or boron), that is to say, impurities prevent the growth of a crystal, then, functions to provide small crystal grain.

In our experience, a film produced by electroless plating including two elements like nickel-phosphorus, or nickel-boron, has excellent high volume resistivity, but has the disadvantage that the thermal stress characteristics are wrong. This is to say, the resistivity of the material changes in a short time when a heater element is heated by applying voltage.

The reason why the resistivity changes when a film is heated by applying voltage in case of electroless plating film is that the size of crystal in a film becomes large by thermal stress. Accordingly, we reached the conclusion that some minor additive agent for preventing the growth of a crystal would be effective for stable resistivity of a film.

The inventors found that tungsten and/or molybdenum is available as that agent for stabling resistivity of a heater element which is produced through electroless plating.

Figure 2:
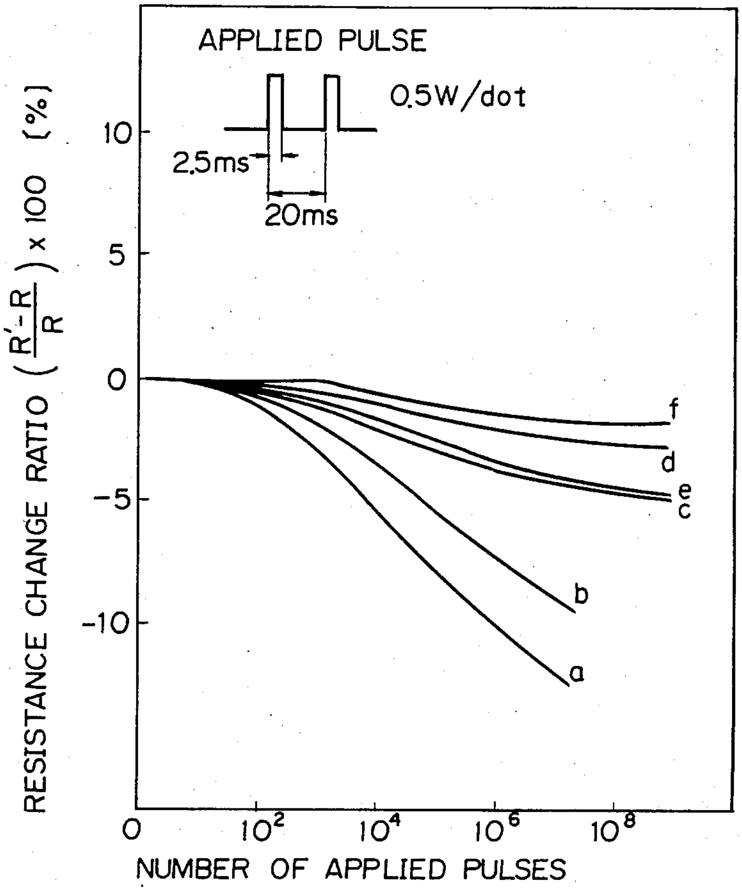
FIG. 2 is experimental curves of heater elements.

FIG. 2 shows experimental curves showing the relationship between a number applied pulses to a heater element and change ratio of resistivity ($=(R'-R)/R$), where R is resistance before experimentation, and R' is resistance after applying pulses. In FIG. 2, the initial resistance of the sample heater element is 200 ohms, the applied power to that heater element is 0.5 watt, the pulse width of the applied pulses is 2.5 mili-second, and the period of the applied pulses is 20 mili-seconds.

The curve (a) shows the characteristics of material with two elements (nickel-phosphorus), and the curve (b) shows the characteristics of nickel-boron element. The curves (c), (d), (e) and (f) show the characteristics of the present materials which include one of tungsten and molybdenum. The composition of films and plating liquid of each samples ((a) through (f)) are shown in the table 1.

| Layer | Plating liquid | | Layer composition |
|---|---|---|---|
| a | nickel sulfate; | 20 gr/liter | Ni: 90 weight % |
| | sodium citrate; | 40 gr/liter | P: 10 weight % |
| | sodium hypophosphite; | 10 gr/liter | |
| | pH; | | 6.5 |
| | liquid temperature; | | 90° C. |
| b | nickel sulfate; | 20 gr/liter | Ni: 97 weight % |
| | malonic acid; | 50 gr/liter | B: 3 weight % |
| | dimethyl-amine-boron; | 10 gr/liter | |
| | pH; | | 6.0 |
| | liquid temperature; | | 80° C. |
| c | nickel sulfate; | 7 gr/liter | Ni: 85 weight % |
| | sodium citrate; | 15 gr/liter | P: 10 weight % |
| | sodium molybdophosphate; | 20 gr/liter | Mo: 5 weight % |
| | pH; | | 9.3 |
| | liquid temperature; | | 90° C. |
| d | nickel sulfate; | 7 gr/liter | Ni: 92 weight % |
| | malonic acid; | 20 gr/liter | B: 3 weight % |
| | dimethyl-amine-boron; | 10 gr/liter | Mo: 5 weight % |
| | sodium molybdophophate; | 10 gr/liter | |
| | pH; | | 6.0 |
| | liquid temperature; | | 80° C. |
| e | nickel sulfate; | 7 gr/liter | Ni: 85 weight % |
| | sodium citrate; | 15 gr/liter | P: 10 weight % |
| | sodium tungstate; | 25 gr/liter | W: 5 weight % |
| | sodium hypophosphite; | 7 gr/liter | |
| | pH; | | 9.0 |
| | liquid temperature; | | 90° C. |
| f | nickel sulfate; | 7 gr/liter | Ni; 92 weight % |
| | malonic acid; | 20 gr/liter | B; 3 weight % |
| | sodium tungstate; | 25 gr/liter | W; 5 weight % |
| | dimethyl-amine-boron; | 10 gr/liter | |
| | pH; | | 6.0 |
| | liquid temperature; | | 80° C. |

Figure 3:
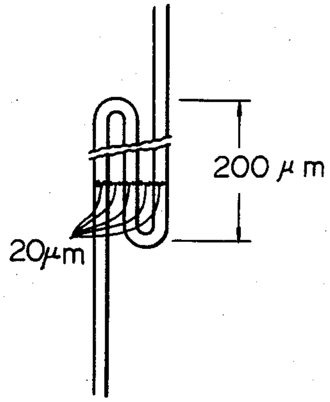
FIG. 3 shows a meander pattern which is used for the experiment of FIG. 2 and FIG. 3 as the shape of a heater element.

In the experiment of FIG. 2, the shape of a heater element is a meander pattern with three lines, with 20 microns width and period, and 200 microns length as shown in FIG. 3.

It should be appreciated in FIG. 2 that the change ratio of resistivity of the samples (a) and (b) increases as the number of the pulses applied to the sample increase, and that change ratio of the sample (a) just when the heater element is broken is −12.5%, and the change ratio of the sample (b) just when the heater element is broken is −9.0%. On the other hand, the change ratio of the resistivity of the samples (c), (d), (e) and (f) is small even when a large number of pulses are applied. The change ratio of the sample (c) just when the heater element is broken is −5.0%, the change ratio of the samples (d), (e) and (f) is, −2.7%, −4.8%, and −1.7%, respectively. The change ratio of the samples (c) through (f) is considerably small as compared with that of the samples (a) and (b). Further, the life time of a heater element, that is to say, the number of the pulses applied to the sample until the heater element is broken is $2\times10^7$-$3\times10^7$ pulses for the samples (a) and (b), while that number of the pulses is $3\times10^8$-$7\times10^8$ pulses for the samples (c) through (f). Thus, it should be noted that the life time of the samples (c) through (f) is considerably improved as compared with that of the samples (a) and (b).

Figure 4:
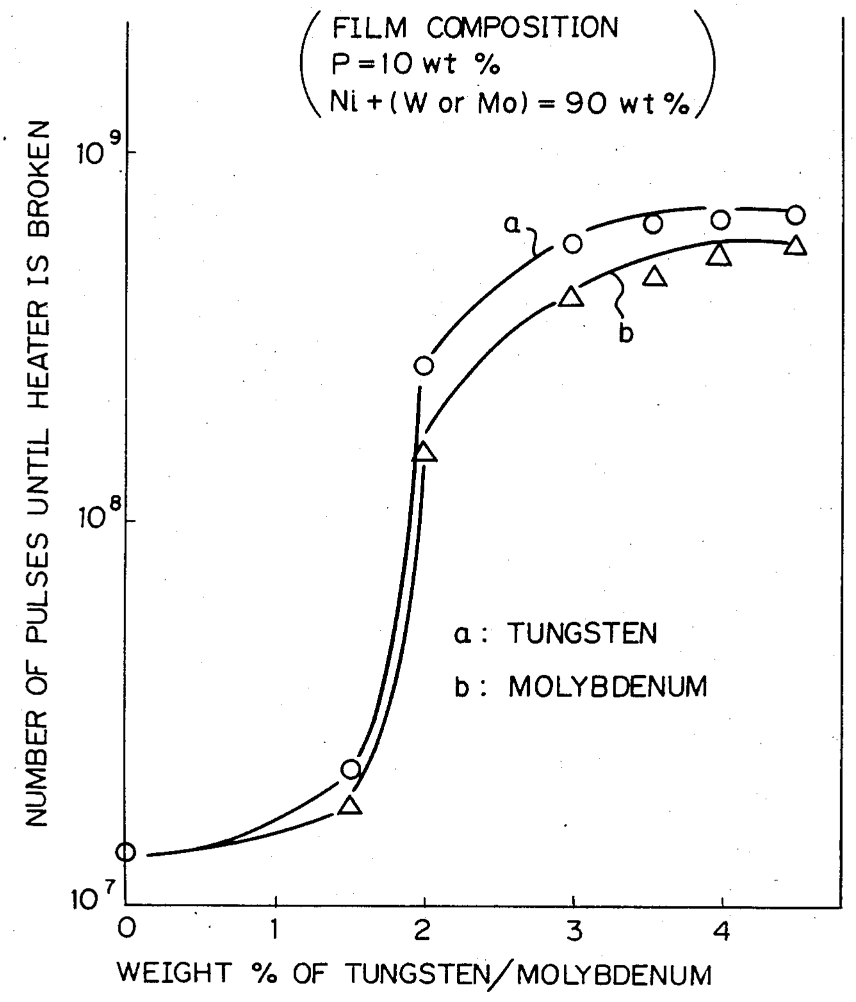
FIG. 4 shows other experimental curves of the heater elements according to the present invention.

FIG. 4 shows other experimental curves in which the horizontal axis shows the weight ratio of additive agent (tungsten or molybdenum) in material of a heater element, and the vertical axis shows the number of pulses applied to a heater element until the heater element is broken. The sample for the test of FIG. 4 has the composition that the weight ratio of P (phosphorus) is 10 weight %, and the weight ratio of Ni (nickel) and additive agent (tungsten or molybdenum) is 90 weight %. The curve (a) in FIG. 4 shows the characteristics of the sample including tungsten, and the curve (b) shows the characteristics of the sample including molybdenum. The liquid used in those experiments is similar to that of the liquid c (Ni-P-Mo), or the liquid e (Ni-P-W) in the experiments of FIG. 2, except that the quantity of additive agent (Mo or P) is adjusted. It should be appreciated in FIG. 4 that the life time is considerably increased when tungsten or molybdenum is included by more than 2 weight %. We also found in the experiment that an excellent thermal head with long life time is obtained when additive agent (Mo or W) up to 10 weight % is included.

It should be appreciated of course that the present invention is not restricted to the above samples (c) through (f), but covers any material which is composed of nickel and phosphorus, or nickel and boron, with additive agent (tungsten or molybdenum) by 2-10 weight %.

Figure 5A:
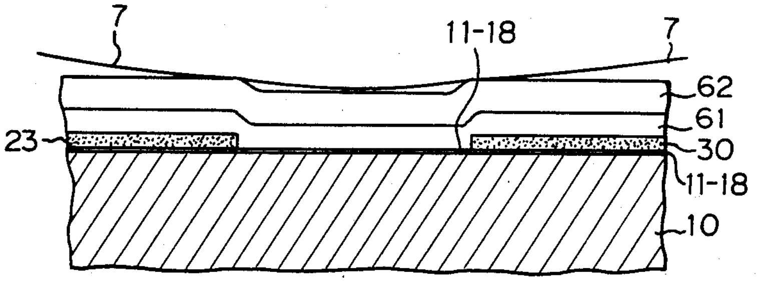
FIG. 5A and FIG. 5B show structure of a thermal head to which the present heater element is applied.
Figure 5B:
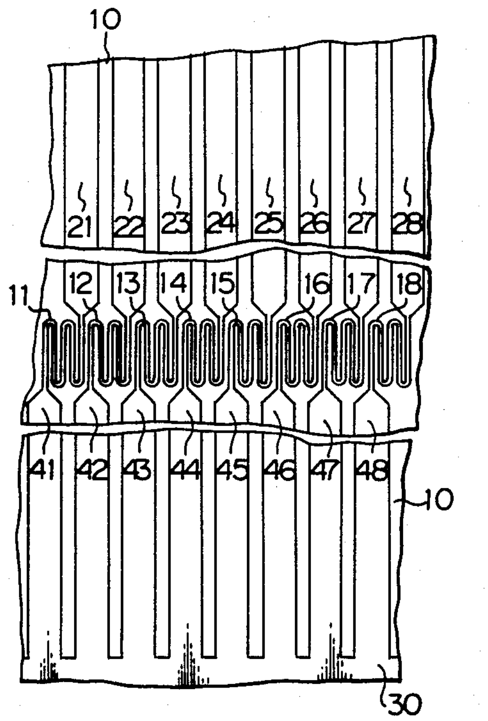

The present heater element material is applicable to any conventional thermal head. FIG. 5A is a cross section of an example of a thermal head to which the present invention is applied, and FIG. 5B is the plane view of FIG. 5A, which is shown in U.S. Pat. No. 4,136,274. In FIGS. 5A and 5B, the numeral 10 is a dielectric substrate, 11 through 18 are heater elements of the present invention in a meander pattern. The numerals 21 through 28, and 41 through 48 are lead lines coupled with said heater elements for supplying current to those heater elements. The numeral 30 is a commn lead line coupled with one group of lead lines 41 through 48. The numerals 61 and 62 are protection layers, the former is for preventing the oxidation of the heater elements, and the latter is for reducing the wear of the heaters due to friction with a thermal paper 7. When the composition of the heater elements 11 through 18 satisfies the present invention, the thermal head with long life time and excellent heat stress characteristics is obtained.

As mentioned above, the present thermal head has a heater element made of electroless plating film composed of nickel-phosphorus or nickel-boron with additive agent tungsten or molybdenum by more than 2 weight %. The additive agent up to 10 weight % is possible in the present invention. Therefore, the manufacturing cost of a heater element is low, and the life time and the heat stress characteristics of the heater element are excellent.

From the foregoing it will now be apparent that a new and improved thermal head had been found. It should be understood, of course, that the embodiments disclosed are merely illustrative and are not intended to limit the scope of the invention. Reference should be made to the appended claims, therefore, rather than the specification as indicating the scope of the invention.

What is claimed is:

1. A thermal printing head having a dielectric substrate, a plurality of heater elements attached on a surface of said substrate through electroless plating, and lead lines coupled with the heater elements for supplying power to the same, wherein the material of the heater elements comprises nickel, at least one of phosphorus and boron, and at least 2% by weight of an additive agent selected from at least one of tungsten and molybdenum.

2. A thermal printing head according to claim 1, wherein the amount of the additive agent is in a range of between 2% by weight and 10% by weight.

3. A thermal printing head according to claim 1, wherein the additive agent is tungsten.

4. A thermal printing head according to claim 1, wherein the additive agent is molybdenum.

* * * * *